Sept. 7, 1965     A. G. KERR ETAL     3,205,428
DIRECT CURRENT GENERATORS
Filed Aug. 7, 1962
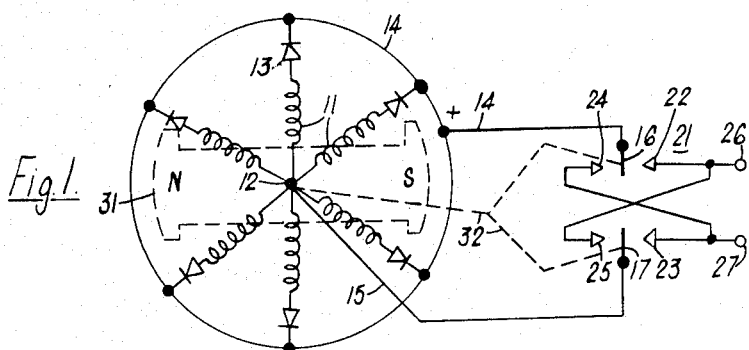
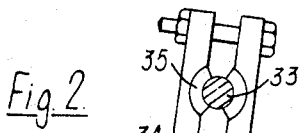
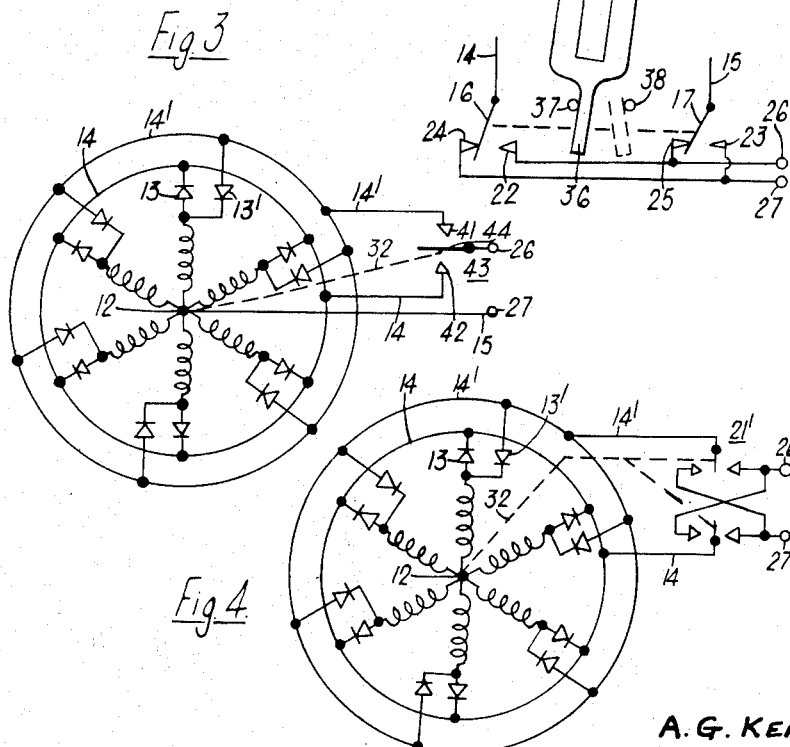
Inventors
A. G. KERR
J. Y. C. MONTGOMERY
By
Cameron, Kerkam & Sutton
Attorneys United States Patent Office 3,205,428
Patented Sept. 7, 1965

3,205,428
DIRECT CURRENT GENERATORS
Andrew Guy Kerr, Edinburgh, and John Young Condie Montgomery, Newhaven, Edinburgh, Scotland, assignors to Ferranti, Limited, Hollinwood, Lancashire, England, a company of Great Britain and Northern Ireland
Filed Aug. 7, 1962, Ser. No. 215,439
Claims priority, application Great Britain, Aug. 16, 1961, 29,508/61
8 Claims. (Cl. 322—5)

This invention relates to direct-current generators of the rotating kind and in particular though not exclusively to D.-C. tachometers for use in servo systems. Such a tachometer usually takes the form of a small dynamo designed to have an accurately linear volts/speed characteristic with the sense of the voltage dependent on the direction of rotation. The dynamo includes a conventional commutator to rectify the alternating voltage which is generated in the armature conductors through their rotation in the field set up by the stator.

When used in the feedback loop of a servo system such a machine often gives trouble due to sparking at the commutator brushes, which may be carrying large currents at the instants of break, and due to voltage surges caused by the brushes bridging adjacent commutator segments and so short-circulating the turns of the armature. Further, the commutators of such machines are apt to wear badly.

It is known to avoid these commutation troubles by generating first an alternating voltage in stator windings (thereby obviating the need for slip rings) and rectifying this voltage. But a voltage so generated will not change sign with a change in the direction of rotation unless the rectification is effected by a relatively complex phase-sensitive rectifier.

An object of the present invention is to provide a simple form of direct-current generator of the rotating kind the output voltage of which is dependent in sense on the direction of rotation and which makes no use of rotating pick-ups such as commutators or slip rings.

In accordance with the present invention, a direct-current generator includes stator windings in the magnetic field of a rotor, rectifying means individual to each winding, and a reversing switch arranged to be operated to one or other of two conditions in dependence on the direction of rotation of the rotor, each winding and associated rectifying means being interconnected with the switch and a pair of output points so as to provide in operation a voltage dependent in sense on the condition of the switch.

In the accompanying drawings,

FIGURE 1 is a diagram of one embodiment of the invention,

FIGURE 2 shows in detail a part shown generally in FIGURE 1, and

FIGURES 3 and 4 are diagrams similar to FIGURE 1 of two further embodiments.

In carrying out the invention in accordance with one form by way of example, a D.-C. tachometer generator for a servo system includes a stator having windings 11 arranged as for a six-phase star-connected alternator, the star or common point being indicated at 12. The free end of each winding is connected through rectifying means individual to it in the form of a rectifier 13 to a common buswire 14, the rectifiers being all poled in the same sense with respect to the star point. A second buswire 15 is connected to star point 12.

Buswires 14 and 15 are connected to the moving contacts 16 and 17 of a double-pole changeover switch 21 the four fixed contacts 22 to 25 of which are cross connected in the usual reversing manner to a pair of output points in the form of the terminals 26 and 27 of the generator. The rotor 31 may be considered as of the two-pole form, shown in broken lines so as not to confuse the drawing, and is permanently magnetised. From the rotor shaft (not shown in FIGURE 1) a suitable mechanical link (indicated by the broken line 32) controls the moving contacts 16 and 17 of switch 21 so that when the rotor is rotating in one direction the switch is in the condition such that contacts 16 and 17 engage the fixed contacts 22 and 23, thereby connecting buswires 14 and 15 to terminals 26 and 27 respectively, and so that when the rotor is rotating in the other direction the switch is in the condition such that contacts 16 and 17 engage contacts 24 and 25, thereby reversing the connections between the buswires and the terminals so that buswires 14 and 15 are now connected to terminals 27 and 26 respectively. A suitable form of mechanical link 32 is described below with reference to FIGURE 2.

In operation, the stator windings are traversed by the magnetic field of the rotating rotor, with the result that there is generated across buswires 14 and 15 a direct voltage having a ripple the amplitude of which is low owing to the polyphase nature of the stator winding. The sense of this voltage is dependent on the polarities of the rectifiers 13 and so is always the same, irrespective of the direction of rotation.

The required reversal of sense with reversal of direction is determined by the condition of switch 21 under the control of the rotor. This reversal takes place when the rotor is just starting to move from the stationary point of reversal; hence the voltage generated is at a minimum and no trouble is experienced through sparking at the switch contacts. There is thus provided at output terminals 26 and 27 the required direct voltage which reverses in sense with reversal of direction, this reversal being effected without complication of apparatus or trouble due to sparking.

A suitable form of mechanical linkage for controlling switch 21 by the rotor is shown in FIGURE 2. Here the rotor shaft 33 carries a member in the form of a radial arm 34 which makes light frictional engagement with the shaft through pads 35 of low-friction material such as PTFE so that only a slight torque is exerted on the rotating rotor when the arm is stationary. The free end 36 of the arm operates between fixed stops 37 and 38 over a small arc and is coupled to the moving contacts 16 and 17 of switch 21.

Rotation of shaft 33 in the clockwise direction, as seen in the figure, urges the arm by friction against stop 37, as shown in full lines in the drawings, and so operates the switch to the condition in which contacts 16 and 17 engage contact 24 and 25 (say); though the arm can rotate no further in this direction the low-friction pads 35 allow the shaft to continue to rotate with small loss through friction, whilst maintaining a light pressure on arm 34 to maintain the switch so operated.

Reversal of the direction of rotation swings arm 34 across to the fixed stop 38, as shown in broken lines, thereby operating the switch to the condition in which contacts 16 and 17 engage contacts 22 and 23.

The switch may alternatively be of the snap-action kind so as not to be dependent on the continuous torque exerted by shaft 33 through pads 35 for its retention in the actuated position.

In another construction, see FIGURE 3, similar to FIGURE 1, the rectifying means includes for each stator winding a rectifier $13^1$ which is oppositely poled to rectifier 13 and which additionally connects the free end of the winding 11 to a third buswire $14^1$. Buswires 14 and $14^1$ are connected to the fixed contacts 41 and 42, respectively, of a single-pole changeover switch 43 the moving contact 44 of which is connected to terminal 26. Buswire 15 connects the common point 12 direct to terminal 27. Contact 44 is controlled by the mechanical link 32 from rotor 31 (omitted from the drawing for clarity) as were contacts 16 and 17 in the arrangement of FIGURE 1.

In operation, the two oppositely-poled rectifiers 13 and 13[1] connecting the free end of each winding to buswires 14 and 14[1] ensure that one of those buswires is always positive with respect to buswire 15 regardless of the direction of rotation and the other is always negative with respect to buswire 15. Switch 21 selects under the control of the rotor whichever of buswires 14 and 14[1] has the sense appropriate to the direction of rotation of the moment. The advantage of this arrangement is that it allows the use of a simpler form of changeover switch.

A modified form of the arrangement of FIGURE 3 is shown in FIGURE 4. Here the common point 12 is not brought out and the connections to terminals 26 and 27 are made from buswires 14 and 14[1] by way of a double-pole changeover switch 21[1] operated from the rotor as was switch 21 of FIGURE 1. In this arrangement each diametrically opposite pair of windings work together in phase, giving the advantage over the arrangements of FIGURES 1 and 3 of doubling the amplitude of the mean direct voltage generated.

As the amplitude of the ripple varies inversely with the number of phases, it is desirable to have as many stator windings as is practicable. The frequency of the ripple, on the other hand, naturally varies directly with the number of phases; with a large enough number it becomes practicable to smooth the voltage output from the generator without introducing undesirable phase shifts in the feedback loop where the generator forms part of a servo system.

The number of rotor poles need not necessarily be two, but there is normally little advantage in having more than two since the amplitude of the ripple is not thereby reduced.

What we claim is:

1. A direct-current generator including stator windings in the magnetic field of a rotor, rectifying means individual to each winding, and a reversing switch having a movable element, which element is coupled to the rotor so that the switch is operated to one or other of two conditions in dependence on the direction of rotation of the rotor, each winding and associated rectifying means being interconnected with the switch and a pair of output points so as to provide in operation a voltage dependent in sense on the condition of the switch.

2. A direct-current generator including stator windings in the magnetic field of a rotor, rectifying means individual to each winding including a rectifier in series with the winding between a pair of common buswires, the rectifiers being poled in the same sense, and a reversing switch arranged to be operated to one or other of two conditions in dependence on the direction of rotation of the rotor, each winding and associated rectifying means being interconnected with the switch and a pair of output points so as to provide in operation a voltage dependent in sense on the condition of the switch.

3. A generator as claimed in claim 2 wherein the switch is of the double-pole changeover kind and the buswires are connected to the output points by way of the switch.

4. A direct-current generator including stator windings in the magnetic field of a rotor, rectifying means individual to each winding including two oppositely poled rectifiers connecting one end of the winding to two buswires, each to each, the other end of each winding being connected to a common point, and a reversing switch arranged to be operated to one or other of two conditions in dependence on the direction of rotation of the rotor, each winding and associated rectifying means being interconnected with the switch and a pair of output points so as to provide in operation a voltage dependent on the condition of the switch.

5. A generator as claimed in claim 4 wherein the switch is of the single-pole changeover kind, the buswires being connected to one output point by way of the switch, said common point being connected to the other output point.

6. A generator as claimed in claim 4 wherein the switch is of the double-pole changeover kind and the buswires are connected to the output points by way of the switch.

7. A generator as claimed in claim 1 wherein said movable element makes light frictional engagement with a shaft rotated by the rotor and is arranged to operate the switch to one or other conditions when frictionally urged by the shaft rotating in one or other direction as the case may be.

8. A direct-current generator including stator windings in the magnetic field of a rotor, rectifying means connected in series with said stator windings, and a reversing switch having a movable element actuated by the rotor for changing the switch from one to the other of two conditions in dependence on the direction of rotation of the rotor, the stator windings and series connected rectifying means being interconnected with said switch and a pair of output points so as to provide in operation a voltage dependent in sense on the condition of the switch.

References Cited by the Examiner

UNITED STATES PATENTS

| | | | |
|---|---|---|---|
| 1,222,720 | 4/17 | Bijur | 322—5 |
| 2,987,671 | 6/61 | Williams | 324—70 |

LLOYD McCOLLUM, *Primary Examiner.*